A. ORTLIP.
Mill Spindle.
No. 108,045. Patented Oct. 4, 1870.
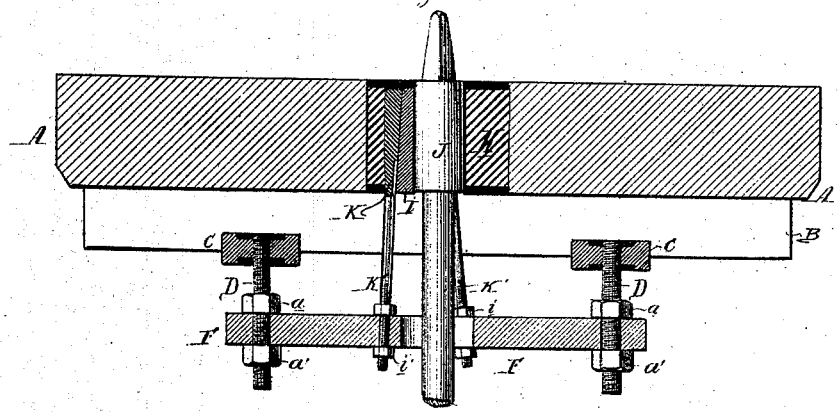
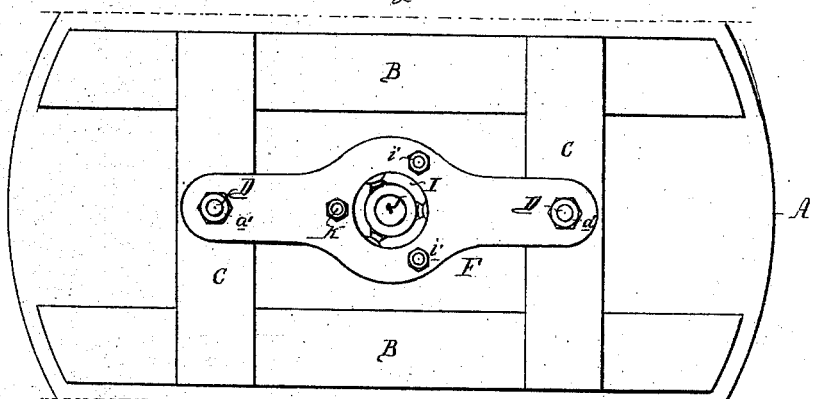
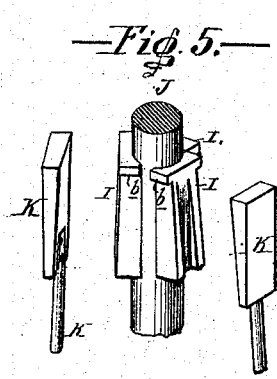
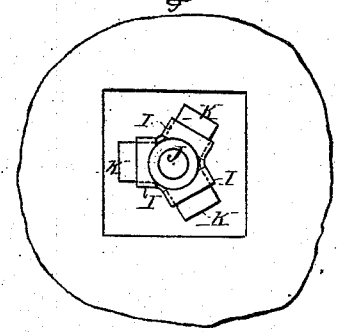
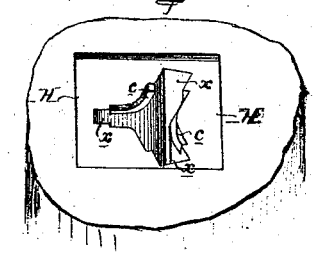
Witnesses:
Wm. A. Steel
John Parker
Andrew Ortlip
by his Att'ys
Howson and Son

United States Patent Office.

ANDREW ORTLIP, OF EAST VINCENT, PENNSYLVANIA.

Letters Patent No. 108,045, dated October 4, 1870.

IMPROVEMENT IN MILLSTONE-BUSHES AND BEARINGS.

The Schedule referred to in these Letters Patent and making part of the same

---

I, ANDREW ORTLIP, of East Vincent, county of Chester, State of Pennsylvania, have invented an Improvement in Millstone-Bushes and Bearings, of which the following is a specification.

Nature and Object of the Invention.

My invention consists, mainly, of a yoke or cross-piece attached to and rendered adjustable upon the frame or beams which support the lower stationary stone of a grinding-mill, the said yoke having attached to it the wedge-shaped followers or bearings (or wedges for working up the bearings) of the upright shaft or spindle which supports the upper revolving stone, an accurate adjustment of the said bearings or followers being much more readily accomplished by means of the yoke than when they are adjusted separately, as usual.

My invention also consists in certain improvements, fully described hereafter, in the bearings or followers, and in the bushing of the lower stone for the reception of the same.

Description of the Accompaning Drawing.

Figure 1 is a sectional view of the lower stationary stone of a grinding-mill with my improvements;

Figure 2, an inverted plan view of the same;

Figures 3 and 4, plan and perspective views of the central portion of the stone, with its bushing; and Figure 5, a perspective view of part of the upright shaft or spindle, with my improved bearings or followers and wedges.

General Description.

A represents the lower stationary stone of a grinding-mill;

B B, two beams, secured to suitable frame-work, and arranged to support the stone; and C C, cross-pieces, secured to the said beams, and provided with threaded rods or bolts, D D, which support a yoke, F, the latter being retained between, and rendered vertically adjustable upon, the said rods by means of nuts, $a$ and $a'$, on each of the latter.

In the center of the stone A is the usual cast-iron bushing, H, for the reception of the bearings or followers I of the upright shaft or spindle J, which supports the upper revolving stone, the latter not being shown in the drawing.

There are, in the present instance, three of the bearings or followers I, this number being quite sufficient to maintain the shaft in its proper position, and being more readily adjusted simultaneously than four or any greater number would be.

The said bearings are adapted to recesses $x$ of the bush H, as shown in fig. 4, and each of them has, at its upper end, flanges, $b\ b$, which rest upon guides or ledges, $c\ c$, of the bush. This enables the bearings to be moved inward or outward, toward or from the shaft, and, at the same time, prevents them from falling, or from being drawn downward out of their proper positions.

For the purpose of forcing the bearings up to the shaft, I employ wedges, K, which are fitted behind each of the bearings I, the latter being slightly inclined, as shown.

Each wedge K has secured to its lower end a rod, K', which passes through an opening in the yoke F, the said rods being threaded, and provided with nuts, $i\ i'$, both above and below the yoke, so that they may be properly adjusted in such a manner as to set the bearings up equally to the shaft, and thus bring the latter to a proper central and vertical position when the several parts are first put together.

The main object of my invention is to enable the bearings, after having been thus accurately adjusted in the first place, to be set up, as the several parts wear away, simultaneously and quickly, and yet with the greatest accuracy, for the slightest deviation of the shaft from the perpendicular will cause a corresponding deviation of the upper stone, and a consequent imperfect operation of the mill.

The yoke F, to which all the wedges for acting upon the bearings are connected, enables the adjustment to be effected in a proper accurate manner, all that is necessary being to lower the yoke by a manipulation of the nuts $a$ and $a'$, in order to depress the wedges, and force the bearings toward the shaft, or to raise the yoke by a contrary adjustment of the nuts, when it becomes necessary to ease the said bearings, owing to the heating, &c., of the shaft.

In some cases, the wedges K, operated by the yoke, as above described, might be used directly as bearings or followers, without the intervention of the pieces I; but I prefer to use the latter, as they insure a bearing upon the shaft at the most advantageous point, while the wedges, if used alone, would have to be moved either upward or downward upon the shaft, in order to tighten them against the same.

Claims.

1. The combination, with the spindle J, of a millstone bush, H, secured in the lower stone, a series of wedges or tapering blocks, fitted to the bush and to the spindle, and an adjustable yoke, F, connected to the said wedges or bearings, so as to operate all the same simultaneously, substantially as set forth.

2. The combination of the said wedges or blocks, the adjustable yoke F, and rods K', connected to the blocks and to the yoke, so as to be adjustable on the latter, as set forth.

3. The combination of the adjustable yoke F, rods D D, and cross-piece C, as described.

In testimony whereof I have signed my name to this specification in the presence of two subscribing witnesses.

ANDREW ORTLIP.

Witnesses:
 WM. A. STEEL,
 HARRY SMITH.